United States Patent
Onorato et al.

(10) Patent No.: US 9,113,198 B2
(45) Date of Patent: Aug. 18, 2015

(54) COMPUTER-IMPLEMENTED METHOD, COMPUTER PROGRAM PRODUCT AND EMBEDDED SYSTEM FOR DISPLAYING OVERLAID DATA ON AN IMAGE BASED ON STRING FREQUENCY

(75) Inventors: Orlando Onorato, Rome (IT); Flavio Console, Rome (IT); Claudia Caldera, Rome (IT); Giovanni Gagliardi, Rome (IT); Aurelio Nocerino, Rome (IT)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 435 days.

(21) Appl. No.: 13/159,881

(22) Filed: Jun. 14, 2011

(65) Prior Publication Data
US 2011/0305283 A1 Dec. 15, 2011

(30) Foreign Application Priority Data
Jun. 15, 2010 (EP) .................................... 10425198

(51) Int. Cl.
*H04N 7/26* (2006.01)
*H04N 21/435* (2011.01)
*G06F 17/30* (2006.01)
*H04N 21/482* (2011.01)

(52) U.S. Cl.
CPC ...... *H04N 21/4355* (2013.01); *G06F 17/30899* (2013.01); *H04N 21/482* (2013.01)

(58) Field of Classification Search
CPC ............. H04N 21/4355; H04N 21/482; G06F 17/30899
USPC ................ 375/240.25, 240.03, 240; 345/660; 725/114; 386/248; 358/1.15; 707/707; 726/5
See application file for complete search history.

(56) References Cited

U.S. PATENT DOCUMENTS

| | | | |
|---|---|---|---|
| 6,636,235 B1 * | 10/2003 | Cooper et al. | 345/660 |
| 6,845,214 B1 * | 1/2005 | Funaya et al. | 386/248 |
| 7,792,814 B2 * | 9/2010 | Cohen | 707/707 |
| 8,321,935 B1 * | 11/2012 | Chen et al. | 726/22 |
| 8,370,942 B1 * | 2/2013 | Peterson et al. | 726/24 |
| 8,418,181 B1 * | 4/2013 | Sirota et al. | 718/102 |
| 2002/0120645 A1 * | 8/2002 | Adapathya et al. | 707/501.1 |
| 2003/0085823 A1 * | 5/2003 | Lee | 341/76 |
| 2003/0128767 A1 * | 7/2003 | Kudoh | 375/257 |

(Continued)

FOREIGN PATENT DOCUMENTS

EP 2164008 A2 3/2010

OTHER PUBLICATIONS

John L. Hennessy, et al: "Computer Architecture: A Quantitative Approach", Jan. 1, 2007, 2 pages.

(Continued)

*Primary Examiner* — Richard Torrente
*Assistant Examiner* — Joseph Suh
(74) *Attorney, Agent, or Firm* — Mannava & Kang, P.C.

(57) ABSTRACT

The present description relates to a computer-implemented method, a computer program product and an embedded system for displaying data more efficiently, wherein the embedded system comprises an integrated circuit and a convertor, and the integrated circuit includes an image codec. The method comprises receiving a string at the embedded system; generating a converted image using the string; producing, by means of the image codec, a decoded image by decoding the converted image; and sending the decoded image to a display device.

15 Claims, 5 Drawing Sheets

(56) References Cited

U.S. PATENT DOCUMENTS

| | | |
|---|---|---|
| 2003/0169369 A1 | 9/2003 | Kahn |
| 2004/0170396 A1* | 9/2004 | Kitamura et al. ............. 386/111 |
| 2005/0002058 A1* | 1/2005 | Hirabayashi ................ 358/1.15 |
| 2005/0004737 A1* | 1/2005 | Fitzner ............................. 701/50 |
| 2005/0268228 A1 | 12/2005 | Buser et al. |
| 2006/0104351 A1* | 5/2006 | Teng ........................ 375/240.03 |
| 2007/0011497 A1* | 1/2007 | Walker ............................ 714/45 |
| 2007/0180485 A1* | 8/2007 | Dua ................................ 725/114 |
| 2007/0263007 A1 | 11/2007 | Robotham et al. |
| 2008/0129866 A1* | 6/2008 | Yamauchi .................... 348/468 |
| 2008/0186150 A1* | 8/2008 | Kao ........................ 340/310.11 |
| 2008/0282150 A1* | 11/2008 | Erwin et al. ................. 715/255 |
| 2008/0292272 A1* | 11/2008 | Yamazaki et al. ............. 386/95 |
| 2009/0027702 A1* | 1/2009 | Sakai ............................. 358/1.9 |
| 2009/0083217 A1* | 3/2009 | Levow .............................. 707/2 |
| 2009/0113223 A1* | 4/2009 | Cho .............................. 713/322 |
| 2009/0113445 A1* | 4/2009 | Sakashita et al. ............ 719/313 |
| 2009/0132553 A1* | 5/2009 | Kohn et al. ................... 707/100 |
| 2009/0303263 A1* | 12/2009 | Minobe ........................ 345/690 |
| 2009/0328163 A1* | 12/2009 | Preece .............................. 726/5 |
| 2010/0166390 A1* | 7/2010 | Fukuya et al. ................. 386/95 |
| 2010/0218232 A1* | 8/2010 | Rodriguez et al. ........... 725/118 |
| 2012/0257019 A1* | 10/2012 | Tsukagoshi .................... 348/46 |

OTHER PUBLICATIONS

European Patent Office, "The Communication" on European Patent Application No. 10425198.8-1507, dated May 13, 2015, 8 pages.

\* cited by examiner

600

```
<html>
<head>
<title>HTTP interface example</title>
</head>
<body>
```
602   `<img src=http://localhost:9000/edtic?`  604
`text=foo` 606
`&font_path=/tmp/font.ttf` 608
`&master_path=/tmp/master.png` 610
`&x=10` 612
`&y=25` 614
`&font_color=FFFFFF` 616
`&font_size=10` 618
`/>`
`</body>`
`</html>`

FIG 6

COMPUTER-IMPLEMENTED METHOD, COMPUTER PROGRAM PRODUCT AND EMBEDDED SYSTEM FOR DISPLAYING OVERLAID DATA ON AN IMAGE BASED ON STRING FREQUENCY

PRIORITY

This application claims priority to European patent application serial number 10 425 198.8, filed on Jun. 15, 2010, and entitled "A Computer-Implemented Method, A Computer Program Product and an Embedded System for Displaying Data More Efficiently", which is incorporated by reference in its entirety.

SUMMARY

The present application relates to a computer-implemented method, a computer program product and an embedded system for displaying data more efficiently.

According to an aspect, a computer-implemented method for displaying data more efficiently using an embedded system is provided. The embedded system may comprise an integrated circuit and a convertor, and the integrated circuit may include an image codec. The method may comprise receiving at least one string at the embedded system. The method may also comprise generating, by means of the convertor, a converted image using the string. The method may further comprise producing, by means of the image codec, a decoded image by decoding the converted image. Moreover, the method may comprise sending the decoded image to a display device.

In some cases, the string is frequently modified. In other words, the converted image generated using the string must be frequently updated or changed (i.e. generated using a different string). Also, it is possible that a less frequently modified string will not be converted using the convertor.

The method may further comprise receiving an original image at the embedded system. Generating the converted image using the string may comprise overlaying the string on the original image.

Also, the embedded system may include a client separate from the convertor. Thus, the method may further comprise implementing the convertor as an extension of the client.

In some cases, the client does not include functionality to generate the converted image using the string.

The method may comprise determining at least one format parameter corresponding to the string, and generating the converted image based on the format parameter.

Furthermore, the method may comprise sending the format parameter to a TCP/IP interface of a server on the embedded system. Accordingly, generating the converted image may be performed by the server.

Moreover, the method may comprise passing the format parameter to a library function on the embedded system. Accordingly, generating the converted image may be performed by the library function.

In some embodiments, the integrated circuit is a processor. Also, the integrated circuit may be a system on a chip including a Digital Signal Processor. In addition, the integrated circuit may be a Digital Media Processor.

The method may also comprise receiving a video signal at the embedded system. Moreover, the method may comprise decoding the video signal, and sending the decoded video signal from the embedded system to the display device.

In some cases, the image codec is a JPEG codec or a PNG codec.

Also, the embedded system may be a set top box.

According to another aspect, a computer program product comprising computer-readable instructions is provided. The computer readable instructions, when loaded and executed on an embedded system, may cause the system to perform operations according to the method described above.

According to yet another aspect, an embedded system is provided. The system may comprise a client operable to receive a string. The system may also comprise convertor operable to generate a converted image using the string, wherein the convertor is separate from the client. Moreover, the system may comprise an integrated circuit operable to use an image codec to produce at least one decoded image from the converted image. In addition, the system may be operable to send the decoded image to a display device.

The subject matter described in this specification can be implemented as a method or on an embedded system, possibly in the form of one or more computer program products. The subject matter described in the specification can be implemented in a data signal or on a machine readable medium, where the medium is embodied in one or more information carriers, such as a semiconductor memory or a hard disk. Such computer program products may cause a data processing apparatus to perform one or more operations described in the specification.

In addition, subject matter described in the specification can also be implemented as a system including a processor, and a memory coupled to the processor. The memory may encode one or more programs to cause the processor to perform one or more of the methods described in the specification. Further subject matter described in the specification can be implemented using various machines.

Details of one or more implementations are set forth in the exemplary drawings and description below. Other features will be apparent from the description, the drawings, and from the claims.

TECHNICAL DEFINITIONS

An "embedded system" may be understood as a computer system or a device designed to perform one or a few dedicated functions. The embedded system may be contrasted with a general purpose computer system, e.g. a desktop PC.

A "set-top box" (STB) may refer to an example of the embedded system. The STB may be operable to connect to a display device (e.g. a television or a computer) and an external signal source. The STB may be operable to convert a signal received from the external signal source into content which is then displayed on the display device.

An "integrated circuit" (also known as a microcircuit, microchip, or chip) may refer to a miniaturized electronic circuit that has been manufactured in the surface of a thin substrate of semiconductor material.

A "digital signal processor" (DSP) may be understood as a specialized microprocessor optimized for certain operations, possibly including the processing (e.g. conversion) of signals. In comparison to a general purpose microprocessor, a DSP may have reduced hardware complexity, reduced functionality, lower cost, better performance, and reduced power consumption.

A "system on a chip" (SoC) may refer to the integration of the components of a computer system on a single integrated circuit. Extra memory and/or peripherals may be needed in order for the SoC to achieve full functionality. The SoC may include the DSP.

A "Digital Media Processor" (DMP), also referred to as a media processor, may be understood as an SoC which is designed to process a stream of data (e.g. media such as video or audio) in real time (or near real time). The DMP may include one or more DSPs, a memory interface, a media interface, and audio/video accelerators. The DMP may be capable of decoding, transcoding (converting from one format to another), encoding, and transrating (scaling from a higher to a lower bit rate) various types of media (e.g. images) and media streams.

A "codec" may refer to functionality capable of encoding and/or decoding a digital data stream or signal. Encoding may involve compression, encryption, and/or removal of data based on certain criteria. Decoding may involve reversing the process of encoding.

An "image" may be understood as an artifact that has a similar appearance to a subject. In the following text, the term image refers to a still or static image. The image may be rasterized and/or encoded. A moving image will be referred to as video.

A "servlet" may be implemented as an object that receives a request and generates a response (possibly by contacting other objects) based on the request. The servlet may be used to generate dynamic content, such as Hypertext Markup Language (HTML) or Extensible Markup Language (XML). The servlet may be realized using Java.

A "string" may be understood as a finite sequence of characters, where each character is a unit of information such as a symbol. "Text" may include one or more strings.

BRIEF DESCRIPTION OF THE FIGURES

FIG. 6 shows an example of HTML code that can be sent as a request to the HTTP interface.

DETAILED DESCRIPTION

In the following, a detailed description of examples will be given with reference to the drawings. It should be understood that various modifications to the examples may be made. In particular, elements of one example may be combined and used in other examples to form new examples.

A simple way to display data using an embedded system would be to send all text and image data to be displayed to the embedded system. The embedded system could be provided with sufficient resources to ensure the data can be processed and displayed quickly.

However, in order to minimize costs, embedded systems are sometimes manufactured with limited resources. For example, a typical STB may include a 300 MHz CPU, 64 MB RAM, and 32 MB flash. Moreover, it may not be feasible to use modern software to provide a user interface on the embedded system. Accordingly, a client (the client may include a user interface) of the embedded system may be implemented using a web browser that is 4 to 10 years old and does not include certain functionality. For example, the client may provide limited control over the arrangement and manipulation of images. More specifically, the client may be unable to dynamically overlay a text string onto an image. Also, the client may be unable to support Java Applets, Java Xlets, ActiveX controls, or similar technologies.

One possible way to display data more efficiently using the embedded system is to use an external server to convert the text data to be displayed into image data. Accordingly, instead of receiving text and image data to display, the embedded system simply receives a set of images. The image data can be efficiently decoded using image codecs on the embedded system. Moreover, the image codecs of the embedded system may make it possible to display images faster than text. There may also be other reasons that images can be displayed faster than text using the embedded system, such as characteristics of the client (e.g. a web browser) on the embedded system.

This solution has the advantage that the external server generally has more resources than the embedded system. Thus, the text to image conversion on the external server may not be very performance sensitive and can be quickly implemented using a high level language such as Java, or even a scripting language such as Perl or PHP (PHP: Hypertext Preprocessor). Moreover, it may be relatively easy to recover from errors in a particular program on the external server, particularly in comparison to the embedded system. For example, memory leaks in a program may have less of an impact on the external server than on the embedded system. Therefore, extensive debugging and testing of the text to image conversion on the external server may not be necessary.

However, an alternative way to display data more efficiently using the embedded system may also be desirable.

Figure 1:
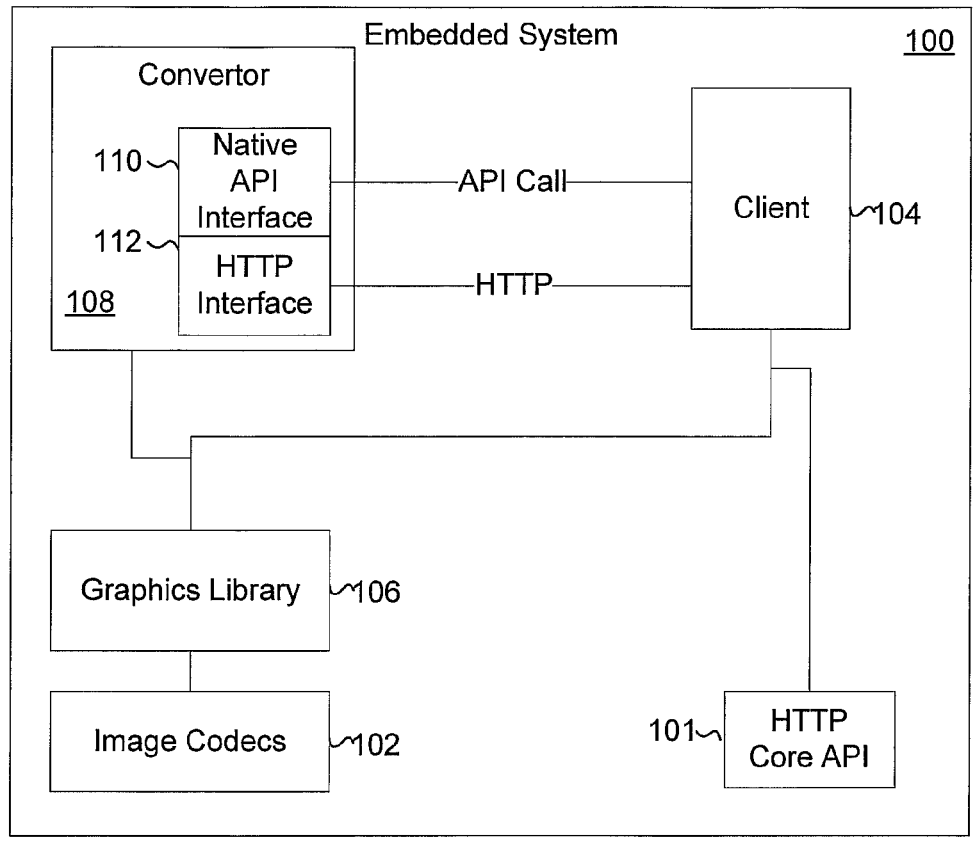
FIG. 1 is a block diagram showing functional components of an embedded system.

FIG. 1 is a block diagram showing functional components of an embedded system 100.

The embedded system 100 may include an integrated circuit. The integrated circuit may be implemented as a processor, preferably an SoC, more preferably a DMP. The embedded system 100 may also include one or more of the following: a volatile memory (e.g. RAM), a non-volatile memory (e.g. flash), a hard drive (possibly external and connectable via a USB port), a network port (e.g. Ethernet), an audio port, and a video port. Further hardware functionality can also be included on the embedded system 100.

The embedded system 100 may be implemented as an STB.

The functional components of the embedded system 100 may include an Hypertext Transfer Protocol (HTTP) core Application Programming Interface (API) 101, image codecs 102, a client 104, a graphics library 106, and a convertor 108.

An operating system, e.g. Linux or Windows CE, may be stored on the embedded system 100. The operating system may include a file system and various drivers, such as a network driver. The operating system may also include an application programming interface (API) for hypertext transfer protocol (HTTP), referred to as the HTTP core API 101.

The integrated circuit may include various media codecs, such as image codecs 102. The image codecs 102 may accelerate processing of images (e.g. encoding, decoding, transcoding) in a number of formats including joint photographic experts group (JPEG), portable network graphics (PNG), and graphics interchange format (GIF).

The client 104 may be operable to receive data, e.g. text and images. The data received by the client 104 may be sent from a backend server (see FIG. 2). The backend server may be implemented separately from the embedded system 100 and may be capable of sending data to the embedded system 100 and responding to requests from the embedded system 100.

The client 104 may be implemented as a web browser, e.g. Opera or Firefox, or as a custom program. Due to resource constraints on the embedded system 100, the functionality of the client 104 may be limited. For example, when the client 104 is implemented as a web browser, the client 104 may provide limited control over the arrangement and manipulation of images. More specifically, the client 104 may be unable to dynamically overlay a text string onto an image. Also, the client 104 may be unable to support Java Applets, Java Xlets, ActiveX controls, or similar technologies.

In particular, due to the limited functionality, the client 104 may be relatively slow or inefficient in replacing certain text data with new text data. More specifically, the client 104 may be relatively slow in replacing existing text displayed over a background image with new text displayed over the background image. By comparison, the client 104 may be relatively fast in replacing a first image with a second image.

The graphics library 106 may include data structures for storing and manipulating images. Functionality to create an image from a file, handle colors, manage alpha channel information, and draw text on an image may also be included in the graphics library 106. The graphics library 106 may be written in a relatively low level programming language such as C for performance reasons. Also, the graphics library 106 may be capable of using the image codecs 102. In a specific example, the graphics library 106 may be implemented using the GD library.

The convertor 108 may be operable to convert text, e.g. a string, into an image, possibly using the graphics library 106. For example, the convertor 108 may receive a request from the client 104 to generate a converted image using the string. In some cases, generating the converted image using the string may involve overlaying the string on an original image, e.g. a background image. In other words, the converted image may be generated by drawing the string on the background image. The convertor 108 may also be written in a relatively low level programming language such as C or C++, e.g. for performance reasons.

The embedded system 100 may also include a collector (not depicted) that receives signals from other programs. For example, the collector may act as an event manager, and all other programs on the embedded system 100 may generate events and send event information as signals to the collector. The signals received by the collector can contain information about an execution status of programs on the embedded system 100. The signals may also contain information about the usage of physical resources (e.g. CPU, volatile memory, non-volatile memory).

The convertor 108 may be configured to receive information from the collector about the status of other programs on the embedded system 100 and about the usage of physical resources on the embedded system 100. In some cases, the convertor 108 checks the information received from the collector before converting text to an image. For example, if the information received from the collector indicates that the load on the CPU is heavy (e.g. the processor is intensively executing instructions for other applications), the convertor 108 may perform a text to image conversion at a low priority in order to keep the performance of the embedded system 100 at an acceptable level. In other words, the convertor 108 can use information received from the collector to deal with a situation in which other applications are using many of the resources on the embedded system 100 (i.e. there are not many resources available for the convertor 108).

In some cases, the convertor 108 includes at least one interface.

For example, the convertor 108 may include a native interface 110. The native interface 110 may receive input by means of a call to one or more functions. The input may include a string, and possibly format parameters (e.g. font, size, color). Output images may be generated as files or a byte buffer stored in the RAM of the embedded system 100. In particular, the convertor 108 may return a pointer to a first cell of the area of memory containing the byte buffer. Other forms of input and output are also possible.

The convertor may also include a TCP/IP interface, e.g. an HTTP interface 112. The TCP/IP interface may provide access to a server on the embedded system 100. For example, the HTTP interface 112 may provide access to a web server on the embedded system 100. In this case, the server (or web server) may be implemented as part of the convertor 108.

The HTTP interface 112 may receive input such as a string, and optionally, format parameters. The input to the HTTP interface 112 may be provided as part of an HTTP request. The output generated by the HTTP interface 112 may be provided as a response to the HTTP request. In a specific example, the HTTP interface 112 may be implemented using the sys/socket API from the C standard library.

Use of the native interface 110 may result in improved performance in comparison to the HTTP interface 112. However, use of the HTTP interface 112 may enable a simpler implementation of the client 104 in comparison to the native interface 110. The simpler implementation of the client 104 may result in improved stability of the embedded system 100. Individual processes, such as the convertor 108 in the client 104, may affect the stability of the embedded system 100 more than similar processes would affect the stability of a general purpose computer.

In addition, the convertor 108 may be separate from (i.e. external to) the client 104. In some cases, the convertor 108 is implemented as an extension of the client 104. In particular, client 104 may be implemented as a browser and the convertor 108 may be implemented as a browser plugin. In this case, the convertor 108 may be a shared library accessible by the client 104 via the native interface 110. The convertor 108 may include pre-defined functions that can be called by the client 104.

The client 104 may use the convertor 108 to obtain a converted image representing a string according to the at least one format parameter (e.g. font, size, color).

The process of generating a converted image by means of the convertor 108 may be a real-time process that is started upon a request of the client 104. The converted image may be sent from the embedded system 100 to a display device, e.g. a television.

Figure 2:
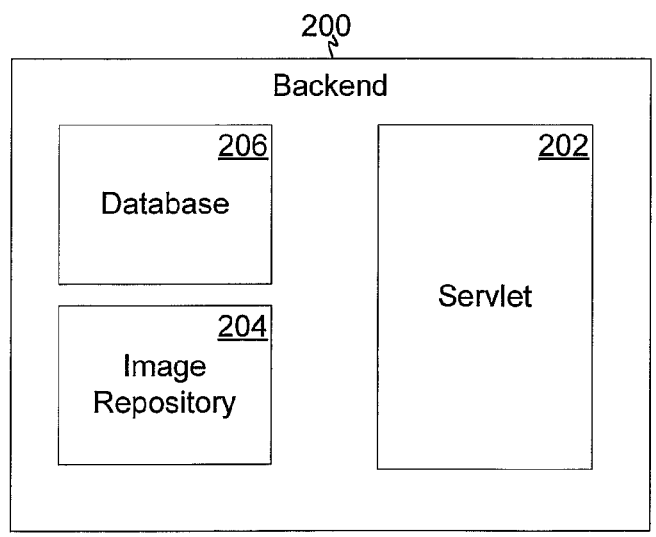
FIG. 2 shows a block diagram of a backend server.

FIG. 2 shows a block diagram of a backend server 200.

A backend server 200 may include request processing functionality, e.g. a servlet 202, an image repository 204, and a database 206. The request processing functionality may be implemented using Java, common Gateway interface (CGI), Active Server Pages (ASP) or a similar technology.

The servlet 202 may respond to requests from the embedded system 100. In particular, the servlet 202 may respond to requests from the client 104.

An image repository 204 may be operable to store images, e.g. background images. The images may be used by the client 104 to provide the user interface of the embedded system 100.

A database 206 may be operable to store text, e.g. strings to be displayed by the client 104. For example, the database 206 may store of film or video categories, electronic program guide (EPG) data, or other text to be displayed by the client 104. The database 206 may be implemented as a single database with a plurality of tables, or as multiple databases stored on one or more computers. Other implementations may also be suitable.

In an alternative implementation, the image repository 204 and the database 206 may be combined in a single unit.

Figure 3:
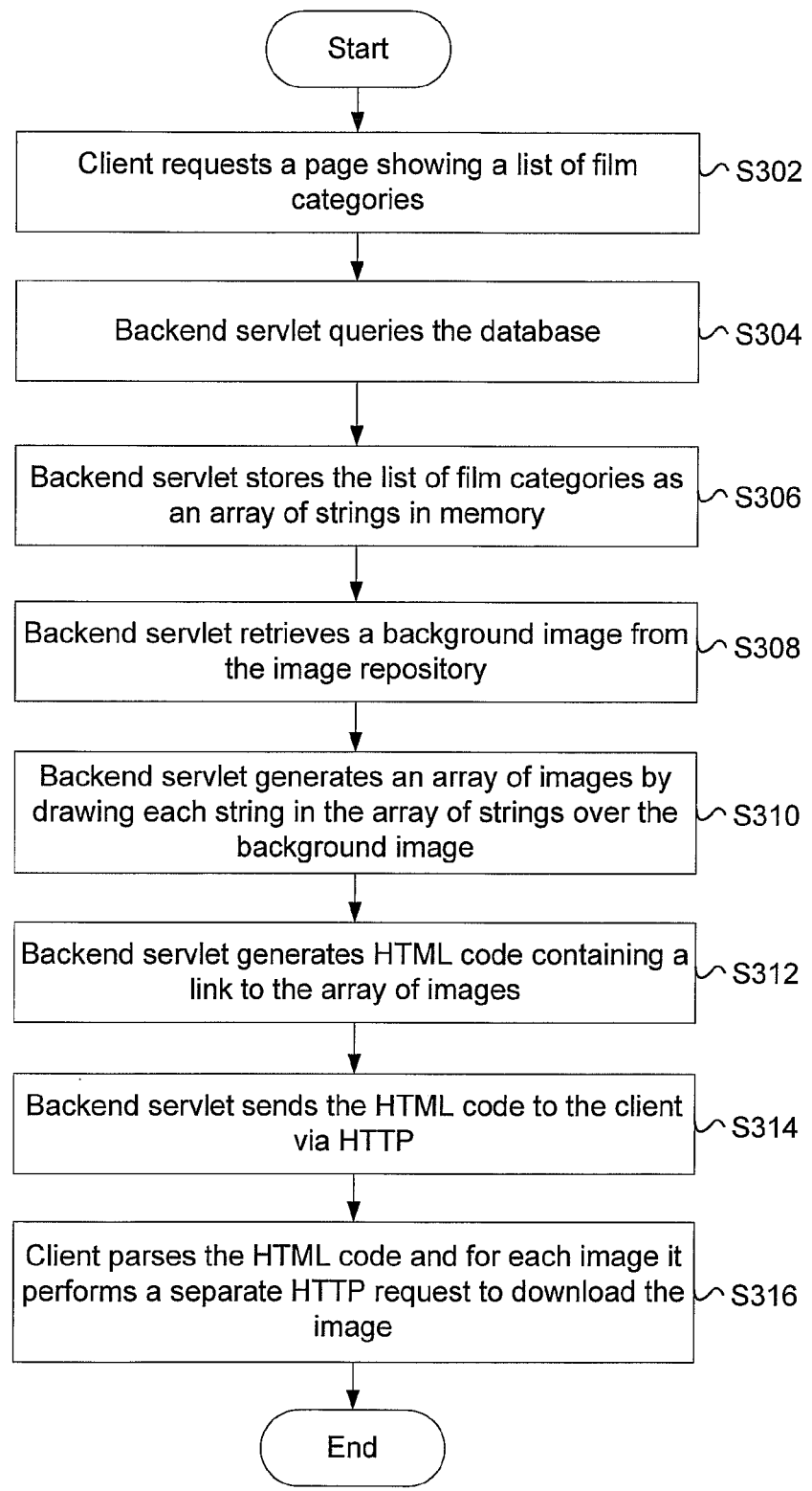
FIG. 3 shows a flow diagram of steps that could be performed in order to display a list of film or video categories using the embedded system.

FIG. 3 shows a flow diagram of steps that could be performed in order to display a list of film or video categories using the embedded system 100. The film categories may be understood as classifications of video content that can be watched using the embedded system 100. In some cases, each film category is implemented as a string. The use of film and video categories in the example of FIG. 3 is for purposes of illustration. Other data, e.g. infrequently modified data, can also be displayed using the method described.

The film categories may be less frequently modified then other data displayed using the embedded system 100. In particular, a string corresponding to a film category may be less frequently modified in comparison to other text displayed using the embedded system 100. For example, the film categories may be modified less than twice per month, less than once per month, less than four times per year, or even less frequently.

At step S302, the client 104 requests the list of film categories from the servlet 202. The request may be sent using http and the client 104 may request a web page including HTML.

According to the example depicted in FIG. 3, at step S304, the servlet 202 queries the database 206 in order to obtain the list of film categories. The list of film categories may be in the form of text.

At step S306, the servlet 202 may store the list of film categories as an array of strings, in a memory of the backend server 200.

At step S308, the servlet 202 may retrieve an original image, e.g. a background image, from the image repository 204 for each text string in the array of strings.

At step S310, the servlet 202 may generate a first converted image from a first string in the array of strings by overlaying the first string on a first background image retrieved in step S308. In other words, the servlet 202 may generate the first converted image by drawing the first string on the first background image retrieved. Accordingly, the servlet 202 may convert each subsequent string from the array of strings into a converted image by drawing the string on the corresponding background image. Step S310 may also be implemented as a scheduled process, e.g. strings received from the database 206 are converted into images once a day and the images are stored as files on the backend server 200. In some cases, text to image conversion on the backend server 200 is implemented using the Java 2D API.

Alternatively, steps S308 and S310 may be implemented by retrieving a single background image at step S308. Accordingly, step S310 may be implemented by overlaying each string from the array of strings on the background image.

In yet another alternative, Step S308 may also be implemented by retrieving a quantity of background images, where the quantity is less than the number of strings in the array of strings. Accordingly, step S310 may be implemented by overlaying a plurality of strings on one or more of the background images.

At step S312, the servlet 202 may generate HTML code including one or more links to the array of images. The HTML code may be sent from the servlet 202 to the client 104 in step S314. The HTML code may be sent using HTTP.

At step S316, the client 104 parses the HTML code. According to the example, for each image in the array of images, the client performs a separate HTTP request to download the image. Other protocols, e.g. file transfer protocol (FTP), could also be used.

Alternatively, step S316 may be implemented such that the client parses the HTML code and performs a single HTTP request for all the images.

Figure 4:
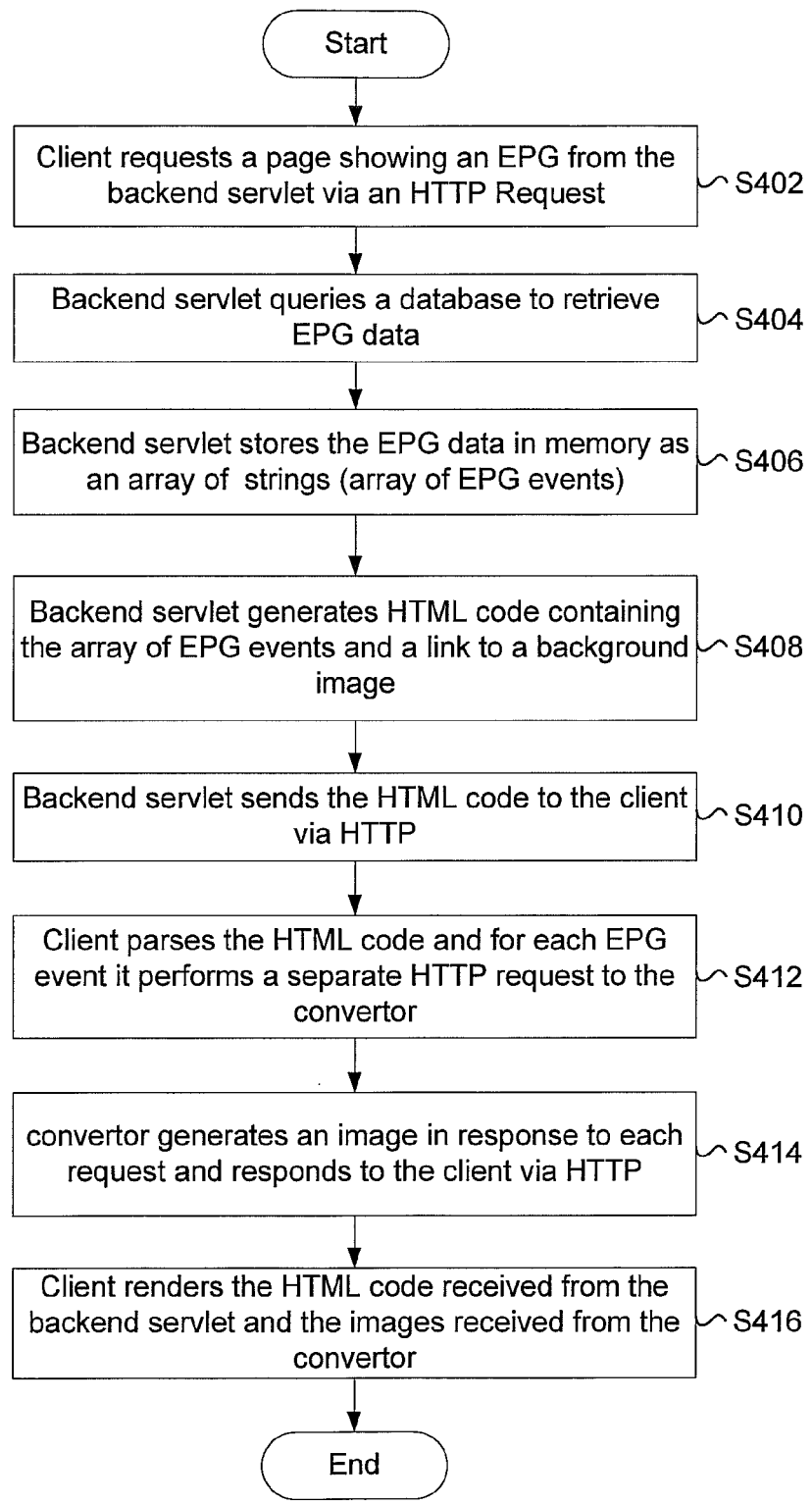
FIG. 4 shows a flow diagram of steps that can be performed in order to display an electronic program guide using an HTTP interface of a convertor.

FIG. 4 shows a flow diagram of steps that could be performed in order to display an electronic program guide (EPG) using the embedded system 100. The EPG is used for illustrative purposes in the example of FIG. 4. Other data, e.g. frequently modified data, could also be displayed using the method described.

The EPG may be understood as a means of determining the video content that can be watched using the embedded system 100. The EPG may consist of text and images, where the text is stored in the database 206 and the images are stored in the image repository 204. The text of the EPG may comprise one or more strings.

In some cases, the EPG is displayed using a single image, including a background image (displayed as part of the single image), a header displayed at the top of the background image (the header may include title information), a body including EPG events, and a footer displayed at the bottom of the screen (the footer may include a legend, advertising, popular selections, etc.).

The EPG may be frequently modified. In particular, the text of the EPG may be understood as being frequently modified by means of a relative comparison, e.g. the text of the EPG is modified more frequently than other text that can be displayed using the embedded system 100 (e.g. film categories). The text of the EPG could also be understood as being frequently modified by means of an absolute comparison. For example, the text of the EPG is modified more frequently than once every two weeks, or the text of the EPG is modified more frequently than once every week.

A string from the text of the EPG may be understood as an example of a frequently modified string displayed using the embedded system 100. Other strings are also possible.

Steps S402 to S406 may be similar to steps S302 to S306.

At step S402, the client 104 requests the EPG from the servlet 202. The client 104 may send the request using HTTP and the client 104 may request a web page including HTML.

According to the example depicted in FIG. 4, at step S404, the servlet 202 queries the database 206 in order to obtain EPG data.

At step S406, the servlet 202 may store the EPG data as an array of strings in a memory of the backend server 200. Other data structures (e.g. a linked list of strings) could also be used.

In the example of FIG. 4, at step S408, the servlet 202 generates HTML code including the EPG data and a link to an original image, e.g. a background image. The EPG data may be represented as a list of EPG events, e.g. an array of strings where each EPG event is represented by a string in the array of strings. The background image or background images may be retrieved as described in step S308. Also, the background image may be considered as an example of the original image since the background image is not generated by the convertor 108. In some cases, the HTML code may include one or more links to a plurality of background images, e.g. a background image for each event.

The HTML code is then sent by the servlet 202 to the client 104 at step S410.

At step S412, the client 104 parses the HTML code sent by the servlet 202. For each EPG event, the client 104 may perform a separate HTTP request to the convertor 108. More specifically, the client 104 may access the HTTP interface 112, and request the convertor 108 to generate a converted image for each EPG event. The HTTP interface 112 may be a loopback (also referred to as localhost) interface of the embedded system 100. In other words, the convertor 108 may use each EPG event to generate a converted image corresponding to the EPG event.

In an exemplary implementation, a first HTTP request is performed for a first EPG event, a first converted image is generated using the first EPG event, and the first converted image is sent from the convertor 108 to the client 104 as a response to the first HTTP request. Sending the first converted image may involve sending a path to a file on the embedded system 100 storing the first converted image. The client 104 may include one or more format parameters in the HTTP request, e.g. in the HTML code. The format parameters may correspond to the EPG event. For example, the format parameters may correspond to the font, size, and color of the EPG event.

Similar HTTP requests and responses may be made for each subsequent EPG event. In addition, the first EPG event may be represented as a string. Each subsequent EPG event may also be represented as a string.

In one example, the client 104 retrieves an original image, e.g. a background image, from the backend server 200 corresponding to each EPG event. Accordingly, step S412 may be implemented by performing a request, e.g. an HTTP request, to the convertor 108 for each EPG event including each background image corresponding to the EPG event. In some cases, a background image may be provided to the convertor 108 by means of a path to a file storing the background image.

In another example, the client 104 retrieves a background image from the backend server 200 corresponding to all EPG events. Thus, the client 104 retrieves a single background image and each request to the convertor 108 is sent using the single background image.

In yet another example, the client 104 does not retrieve a background image from the backend server 200. Thus, each request to the convertor 108 does not include the background image.

At step S414, the convertor 108 generates a converted image in response to each request from the client 104. Each converted image may be generated based on the format parameters included with the corresponding HTTP request. The convertor 108 may respond to the client via HTTP. In some cases, each converted image created in step S412 is generated by overlaying an EPG event on the corresponding background image. In other words, each converted image generated in step S412 is a result of drawing an EPG event on the background image corresponding to the EPG event.

For example, the first converted image is generated using a first EPG event by overlaying the first EPG event on the first background image. Subsequent converted images are generated using the corresponding EPG events and background images. There may be a different background image for each EPG event and resulting converted image. Alternatively, each converted image may be generated using the same background image. Other combinations are also possible, for example, a plurality of converted images may be generated by overlaying EPG events on a first background image, whereas other converted images are generated by overlaying further EPG events on a second background image.

In another example, the first converted image is generated using the first EPG event without using a background image. Subsequent converted images are generated using the corresponding EPG events.

Continuing with the example depicted in FIG. 4, at step S416, the client 104 renders the HTML code parsed in step S412 along with the images generated by the convertor 108 in step S412. Step S416 may include producing decoded images from the converted images by means of the image codecs 102.

Figure 5:
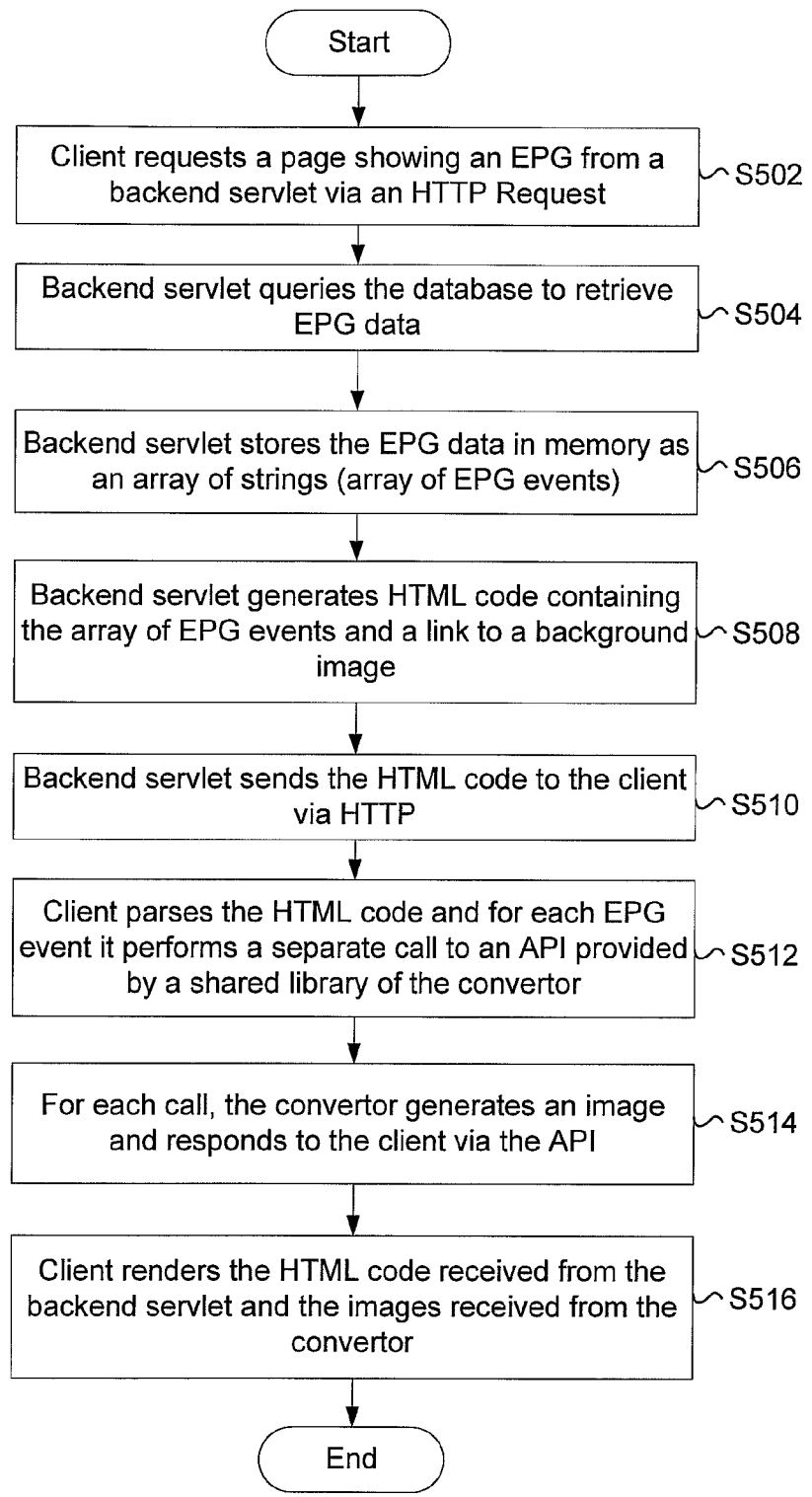
FIG. 5 shows another flow diagram of steps that could be performed in order to display the electronic program guide using a shared library of the convertor.

FIG. 5 shows another flow diagram of steps that could be performed in order to display an electronic program guide (EPG) using the embedded system 100.

Steps S502 to S510 may be identical to steps S402 to S410. Also, the EPG may be implemented as described with respect to FIG. 4.

At step S512, the client 104 parses the HTML code sent from the servlet 202 in step S510 (as described in step S410). For each EPG event in the HTML code, the client 104 may access the native interface 110. More specifically, the client 104 may call a library function (i.e. subroutine) accessible through the native interface 110 for each EPG event. The library function may be implemented as part of a shared library. Furthermore, the client 104 may access one or more functions to the native interface 110.

In an exemplary implementation, a first call to the library function is performed for a first EPG event, a first converted image is generated by the convertor 108 using the first EPG event, and the first converted image is sent as a return value from the convertor 108 to the client 104 in response to the first call to the library function.

The client 104 may include one or more format parameters in the first call to the library function. The format parameters may correspond to the EPG event. For example, the format parameters may correspond to the font, size, and color of the EPG event.

At step S514, the convertor 108 may generate a converted image in response to each call to the library function. The convertor 108 may respond to the client 104 by means of the native interface 110.

Similar calls to the library function may be made for each subsequent EPG event.

In one example, the client 104 retrieves an original image, e.g. a background image, from the backend server 200 corresponding to each EPG event. Accordingly, step S512 may be implemented accessing the convertor 108, e.g. via the library function, for each EPG event. An EPG event and the corresponding background image may be provided to the convertor 108 for each call to the library function. In some cases, a background image may be provided to the convertor 108 by means of a path to a file storing the background image.

In another example, the client 104 retrieves a background image from the backend server 200 corresponding to all EPG events. Thus, the client 104 retrieves a single background image and each call to the library function via the native interface 110 of the convertor 108 is sent using the single background image.

In yet another example, the client 104 does not retrieve a background image from the backend server 200. Thus, each call to the library function does not include the background image.

At step S514, the convertor 108 generates a converted image in response to each function call from the client 104. The converted image may be returned to the client 104 via the native interface 110, e.g. a path to a file storing the converted image may be returned from the library function.

Step S516 may be carried out identically to step S416.

As a result of converting strings to images using the convertor 108, e.g. according to the steps described with respect to FIG. 4 or FIG. 5, the performance of the embedded system 100 may be enhanced, particularly in comparison to another embedded system where all text and images are processed on the embedded system itself. This may be because images can be processed using the image codecs 102, whereas text cannot be processed using the image codecs 102.

The use of the convertor 108 may also result in enhanced performance of the embedded system 100 in comparison to yet another embedded system, where the other embedded system processes images which have been converted from text on a backend server. This may be because of reduced bandwidth requirements when sending text from the backend server 200 to the embedded system 100 in comparison with the bandwidth requirements for sending images from the backend server 200 to the embedded system 100. In other words, it may be possible to download text from the backend server 200 to the embedded system 100 faster than an image can be downloaded from the backend server 200 to the embedded system 100, because the text can generally be represented using less space (i.e. fewer bytes) than the image.

The difference in bandwidth requirements may be particularly significant for text that changes frequently (e.g. the text of the EPG), i.e. when new text must be frequently sent from the backend server 200 to the embedded system 100 in order to update/replace text stored on the embedded system 100.

Advantageously, the client 104, capable of performing the steps according to FIG. 3 does not need an upgrade in order to perform the steps according to either FIG. 4 or FIG. 5. In other words, no changes to the code of the client 104 are required in order for the client 104 to use the convertor 108.

FIG. 6 shows an example of HTML code 600 that can be sent as a request to the HTTP interface 112, as described in step S412.

A benefit of accessing the HTTP interface 112 from the client 104 may be simplicity. Specifically, the client 104 may be simpler to implement when using the HTTP interface 112 rather than the native interface 110 to access the convertor 108. However, use of the native interface 110 may result in improved performance in comparison to the HTTP interface 112.

The HTML code 600 includes an img src tag 602 including a query string. The query string may be part of a uniform resource locator (URL) in an HTTP request.

In the example depicted, the query string includes an HTTP interface name 604, in this example "edtic". Also, the query string includes a string 606, in this example "foo", to be converted into a converted image. Following the string 606 is a font path 608, in this case "/tmp/font.ttf". The font path 608 may refer to a location of a file containing a font In the file system of the embedded system 100. Optionally, the font path 608 may include a font name.

A master path 610 may refer to a location in the file system of the embedded system 100 of a file containing a background image. In this example, the convertor 108 sends the string 606 drawn on the background image referred to by the master path 610 as a response to the request from the client 104. In FIG. 6, the master 610 as a value of "/tmp/master.png".

An x-coordinate 612 may define a margin in pixels measured from the left side of the background image to begin drawing the string 606.

A y-coordinate 614 may define a margin in pixels measured from the top of the background image to begin drawing the string 606.

A font color 616 may define a color in which the string 606 will appear on the background image when drawn.

A font size 618 may refer to a size of the string 606, when the string 606 is drawn on the background image.

The query string may also include a width of the converted image containing the string 606 and the background image referred to by the master path 610. If the width provided in the query string is different from the width of the background image, the background image may be scaled.

In addition, the query string may include a height of the converted image contain the string 606 in the background image referred to by the master path 610. If the height provided in the query string is different from the height of the background image, the background image may be scaled.

The font path 608, a master path 610, the x-coordinate 612, the y-coordinate 614, the font color 616, the font size 618, the width, and the height can be considered format parameters.

What is claimed is:

1. A computer-implemented method for displaying data efficiently using an embedded system, wherein the embedded system comprises an integrated circuit (IC) and a convertor, and wherein the IC includes an image codec, the method comprising:
   receiving, at the IC, a string from a backend servlet, wherein the string is an electronic programming guide (EPG) event and wherein the string is a result of a query from a database by the backend servlet;
   determining whether the string is a frequently modified string or an infrequently modified string, wherein the infrequently modified string is modified at least once and less than twice a month;
   in response to determining the string is the frequently modified string,
      receiving, at the IC, hypertext markup language (HTML) code including the frequently modified string and a link to an image;
      generating, by the convertor, a converted image, from the image, using the frequently modified string, wherein generating the converted image comprises overlaying the frequently modified string on the image;
      producing, by the image codec, a decoded converted image by decoding the converted image; and
      sending, by the IC, the decoded converted image to a display device; and
   in response to determining the string is the infrequently modified string,
      receiving, at the IC, HTML code including the infrequently modified string and a link to an image;
      producing, by the image codec, a decoded image by decoding the image without converting the image, wherein converting the image comprises overlaying the infrequently modified string on the image; and
      sending, by the IC, the decoded image to the display device.

2. The method of claim 1, wherein the embedded system includes a client separate from the convertor, the method further comprising:
   implementing the convertor as an extension of the client.

3. The method of claim 2, wherein the client does not generate the converted image using the frequently modified string.

4. The method of claim 1, further comprising:
   determining a format parameter corresponding to the string, wherein the converted image is generated based on the format parameter.

5. The method of claim 4, further comprising:
   sending the format parameter to a TCP/IP interface of a server on the embedded system;
   wherein generating the converted image is performed by the server.

6. The method of claim 4, further comprising:
   passing the format parameter to a library function on the embedded system;
   wherein generating the converted image is performed by the library function.

7. The method of claim 1, wherein the IC is one of a processor, a system on a chip including a Digital Signal Processor, and a Digital Media Processor.

8. The method of claim 1, further comprising:
receiving a video signal at the embedded system;
decoding the video signal; and
sending the decoded video signal from the embedded system to the display device.

9. The method of claim 1, wherein the image codec is a JPEG codec or a PNG codec.

10. The method of claim 1, wherein the embedded system is a set top box.

11. The method of claim 1, further comprising:
receiving, by the convertor, information from a collector, the information including an execution status of other programs on the embedded system, and a usage of physical resources on the embedded system; and
the generating of the converted image includes prioritizing processes executed by the embedded system based on the information from the collector, wherein the processes include the generating of the converted image, and executing the generating of the converted image according to its priority.

12. A non-transitory computer readable medium storing computer-readable instructions, which, when executed by a processor in an embedded system, causes the system to:
receive a string from a backend servlet, wherein the string is an electronic programming guide (EPG) event and wherein the string is a result of a query from a database by the backend servlet;
determine whether the string is a frequently modified string or an infrequently modified string, wherein the infrequently modified string is modified at least once and less than twice a month;
in response to determining the string is the frequently modified string,
receive hypertext markup language (HTML) code including the frequently modified string and a link to an image;
generate a converted image, from the image, using a frequently modified string, wherein to generate the converted image comprises overlaying the frequently modified string on the image;
produce a decoded converted image by decoding the converted image; and
send the decoded converted image to a display device; and
in response to determining the string is the infrequently modified string,
receive HTML code including the infrequently modified string and a link to an image;
produce a decoded image by decoding the image without converting the image, wherein converting the image comprises overlaying the infrequently modified string on the image; and
send the decoded image to the display device.

13. The computer program product of claim 12, wherein the convertor is to receive information from a collector, the information including an execution status of other programs on the embedded system, and a usage of physical resources on the embedded system, and
to generate the converted image, the convertor is to:
prioritize processes executed by the processor based on the information from the collector, wherein the processes include the generating of the converted image, and
generate the converted image according to its priority.

14. An embedded system comprising:
an integrated circuit (IC);
a client, executed by the IC, to:
receive a string from a backend servlet, wherein the string is an electronic programming guide (EPG) event and wherein the string is a result of a query from a database by the backend servlet, and
determine whether the string is a frequently modified string or an infrequently modified string, wherein the infrequently modified strip is modified at least once and less than twice a month;
receive hypertext markup language (HTML) code including a link to an image and at least one of the frequently modified string and the infrequently modified string;
a convertor, executed by the IC, to:
generate a converted image, from the image, using the frequently modified string in response to the client determining the string is the frequently modified string, wherein to generate the converted image comprises overlaying the frequently modified string on the image;
an image codec, executed by the IC, to
produce a decoded converted image from the converted image in response to generating the converted image, and
produce a decoded image from the image without the converter converting the image in response to determining the string is the infrequently modified string, wherein converting the image comprises overlaying the infrequently modified string on the image;
wherein the embedded system sends the decoded converted image or the decoded image to a display device.

15. The embedded system of claim 14, wherein the convertor receives information from a collector, the information including an execution status of other programs on the embedded system, and a usage of physical resources on the embedded system; and
to generate the converted image, the convertor is to:
prioritize processes executed by the IC based on the information from the collector, wherein the processes include the generating of the converted image, and
generate the converted image according to its priority.

* * * * *

UNITED STATES PATENT AND TRADEMARK OFFICE
CERTIFICATE OF CORRECTION

PATENT NO. : 9,113,198 B2
APPLICATION NO. : 13/159881
DATED : August 18, 2015
INVENTOR(S) : Orlando Onorato et al.

It is certified that error appears in the above-identified patent and that said Letters Patent is hereby corrected as shown below:

Title Page, item (30)
The Foreign Application Priority Data number "10425198" should read "10425198.8".

In the Claims
In Column 14, line 20, Claim 14, "strip" should read "string".

Signed and Sealed this
Twenty-ninth Day of December, 2015

Michelle K. Lee
*Director of the United States Patent and Trademark Office*